Patented Oct. 15, 1940

2,218,250

UNITED STATES PATENT OFFICE 2,218,250

SILVER RECOVERY

Marvin J. Reid, Rochester, N. Y., assignor to Eastman Kodak Company, Rochester, N. Y., a corporation of New Jersey No Drawing. Application August 19, 1938,
Serial No. 225,837

7 Claims. (Cl. 75—83)

This invention relates to a method, involving fusion, for recovering metals from waste obtained from photographic materials and processing, and more particularly to a smelting process carried out in the presence of a flux for recovering silver from photographic plate wastes, hypo wastes, residues and the like.

This application is in part a continuation of my allowed application 135,953, now Patent 2,131,072.

As pointed out in my copending application, the recovery of silver from waste photographic materials presents a number of problems both technical and economic. For example, the quantities of silver involved are quite small and the quality of the silver obtained, if re-used in photographic operations, should be high.

I have found a procedure involving a fusion treatment of silver-containing constituents obtained from photographic materials and processes, wherein silver may be recovered from such solid or semi-solid silver-containing materials relatively efficiently.

This invention has for one object to provide a method for recovering silver from solid or semi-solid waste materials obtained from photographic operations. Another object is to provide a method of silver recovery, involving fusion, adapted to the treatment of solid or semi-solid silver-containing wastes obtained from photographic processes. Still another object is to provide a method for recovering silver, involving fusion, particularly adapted to the treatment of photographic plate wastes, hypo wastes, sludge wastes and other similar sources of silver-containing materials from photographic operations. Another object is to provide a method of recovering silver entrapped in a slag partially soluble in water. Other objects will appear hereinafter.

These objects are accomplished by my invention, which comprises thoroughly incorporating fluxes of certain compositions with solid or semi-solid silver-containing materials initially obtained from photographic operations, carrying out a fusion treatment and thereafter withdrawing and re-utilizing the silver obtained.

A further understanding of my invention will be had from a consideration of the following examples which are set forth for illustrating embodiments of carrying out my invention.

Silver-containing materials in a semi-solid or solid condition are preferably treated. These materials may contain from a few per cent up to 20-25% silver or silver-bearing salts. For each 85-120 parts of such residue to be treated, a flux containing 20-60 parts of sodium carbonate, 1-30 parts of borax and a small amount to 15 parts of silica would be thoroughly incorporated. For example, the incorporation would preferably be carried out in a mechanical mixer such as a pug mill or fluke type mixer, also known as a revolving hoe mixer. The mixture was thereafter smelted in a furnace for about 1½ hours to 3 hours at above 2300° F. Thereafter the furnace was tilted and high-grade molten silver poured therefrom into anode molds.

If the silver wastes being treated were initially from film and paper ash, and certain amounts of iron oxide or iron and barium sulfates are present, the flux would comprise approximately 45-60 parts sodium carbonate, 8-12 parts of silica and 12-18 parts of borax.

If the waste contained substantial amounts of gelatin and silver halides, a flux composition comprising 20-35 parts of sodium carbonate, 2-9 parts of silica and 5-15 parts of borax would be preferred.

If the solid or semi-solid silver waste to be treated contained magnesium and calcium salts, the flux employed would preferably comprise approximately 25-35 parts of sodium carbonate, 8-15 parts of silica and 15-25 parts of borax.

If desired, fluorites and fluorspar may be substituted to some extent for the borax specified. It is also possible to use potassium carbonate for sodium carbonate specified. The silica specified preferably is at least 85% pure and in a very finely divided condition. Otherwise, the coarse silica induces losses of silver.

I have found that in treating hypo wastes the presence of a certain amount of sodium chloride may be advantageous, in addition to certain of the fluxing constituents already described.

I have also found that certain steps of my procedure may be advantageously applied to the recovery of small amounts of silver present in slags from silver operations. Such slags would first be extracted with water and a water insoluble residue obtained. This residue would thereafter be mixed with one or more of the several fluxes which I have described and smelting conducted at temperatures above 2000° F. Generally, a fusion treatment of 1-3 hours at temperatures between 2300-2700° F. is satisfactory, particularly if the several fluxes which I have described have previously been intimately mixed with the waste from which the silver is being recovered.

The silver obtained in my process is high-grade and may be cast into anodes or otherwise utilized as it is poured from the furnace. By the use of the materials specified and in the proportions disclosed, I have found that silver may be sufficiently recovered from solid or semi-solid wastes obtained from photographic operations.

It is apparent from the preceding disclosure that certain variations in my process are possible. However, I have found that other variations in the incorporation of certain constituents in the fluxes entail losses of silver. Since my invention is susceptible of some variation in proportions and ingredients, I do not wish to be restricted therein excepting insofar as is necessitated by the prior art and the spirit of the appended claims.

What I claim and desire to be secured by Letters Patent of the United States of America is:

1. A process for recovering silver from silver-containing wastes obtained from photographic materials, which comprises thoroughly incorporating with said materials a flux comprising 20–60 parts of sodium carbonate, 1–40 parts of borax and 1–20 parts of finely divided silica of at least 85% purity for each 100 parts of said silver-containing materials, subjecting the mixture to fusion at a temperature greater than 2000° F. for a period of 1–3 hours and pouring the casting silver into molds.

2. A process for recovering silver from silver-containing materials obtained from photographic operations, which materials also include iron salts, comprising incorporating with said silver-containing materials a flux including 40–60 parts of sodium carbonate, 5–15 parts of silica and 10–20 parts of borax for each 100 parts of silver-containing materials, subjecting the mixture to fusion at a temperature in excess of 2000° F.

3. A process for recovering silver from silver-containing constituents obtained from photographic operations, said constituents also including large quantities of gelatin and silver halides, which comprises incorporating therewith a flux containing 25–35 parts of sodium carbonate, 1–10 parts of silica, and 1–15 parts of borax for each 100 parts of silver containing constituents, and subjecting the resultant mixture to fusion at a temperature greater than 2000° F.

4. A process for recovering silver from silver-containing wastes initially obtained from photographic materials and including magnesium and calcium salts, which comprises incorporating with the silver-containing waste a flux comprising 20–40 parts of sodium carbonate, 5–15 parts of silica and 15–30 parts of borax for each 100 parts of said silver-containing materials and subjecting the material to fusion at a temperature greater than 2000° F.

5. A process for recovering silver from silver-containing wastes obtained from photographic materials, which comprises thoroughly incorporating with said materials a flux comprising 25–50 parts of sodium carbonate, 1–15 parts of silica and 1–30 parts of at least one component from the group consisting of borax and fluorspar.

6. A process for recovering silver from silver-containing wastes obtained from photographic materials, which comprises thoroughly incorporating with said materials, a flux comprising 20–60 parts of sodium carbonate, 1–40 parts of borax and 1–20 parts of finely divided silica of at least 95% purity for each 100 parts of said silver-containing materials, subjecting the mixture to fusion at a temperature greater than 2000° F. for a period of 1–3 hours and pouring the casting silver into molds.

7. A process for the recovery of small amounts of silver from waste photographic materials, which comprises fusing said materials in the presence of a flux, extracting the slag resulting from the fusion step to obtain an insoluble silver containing residue, and subjecting this insoluble residue to a further fusion treatment in the presence of a borax-containing flux for recovering metallic silver from said residue.

MARVIN J. REID.